United States Patent

Henley

[11] Patent Number: 5,243,778
[45] Date of Patent: Sep. 14, 1993

[54] FISHING SPEAR

[76] Inventor: Frank S. Henley, 12404 184th Ct. North, Jupiter, Fla. 33478

[21] Appl. No.: 23,522

[22] Filed: Feb. 26, 1993

[51] Int. Cl.⁵ .............................................. A01K 81/00
[52] U.S. Cl. ............................................................ 43/6
[58] Field of Search ...................... 43/6; 294/61, 55.5, 294/86.24, 126, 60, 93, 99.1

[56] References Cited

U.S. PATENT DOCUMENTS

| | | | |
|---|---|---|---|
| 1,072,172 | 9/1913 | Schell | 43/6 |
| 2,918,286 | 12/1959 | Foulger | 43/6 |
| 3,071,883 | 1/1963 | Merz | 43/6 |
| 3,932,953 | 1/1976 | Sharp | 43/6 |
| 4,624,068 | 11/1986 | Howard, III | 43/6 |
| 4,896,450 | 1/1990 | Rogers | 43/6 |

Primary Examiner—Mark Rosenbaum
Assistant Examiner—Chuck Y. Mah
Attorney, Agent, or Firm—Norman Friedland

[57] ABSTRACT

The removable spearpoint is spring loaded onto the ejector by a flexible and resilient split ring seated in an annular groove formed in the ejector. A tethering cable looped at either end to hold the spearpoint is looped over the ejector and passed through an intermediate support so as to be removably fixed to the pole, holds the spearpoint to the pole until removed by the operator and is removable from the fish by pulling the cable from the spearpoint and passing the loop remote from the spearpoint through the wound of the gigged fish.

11 Claims, 5 Drawing Sheets

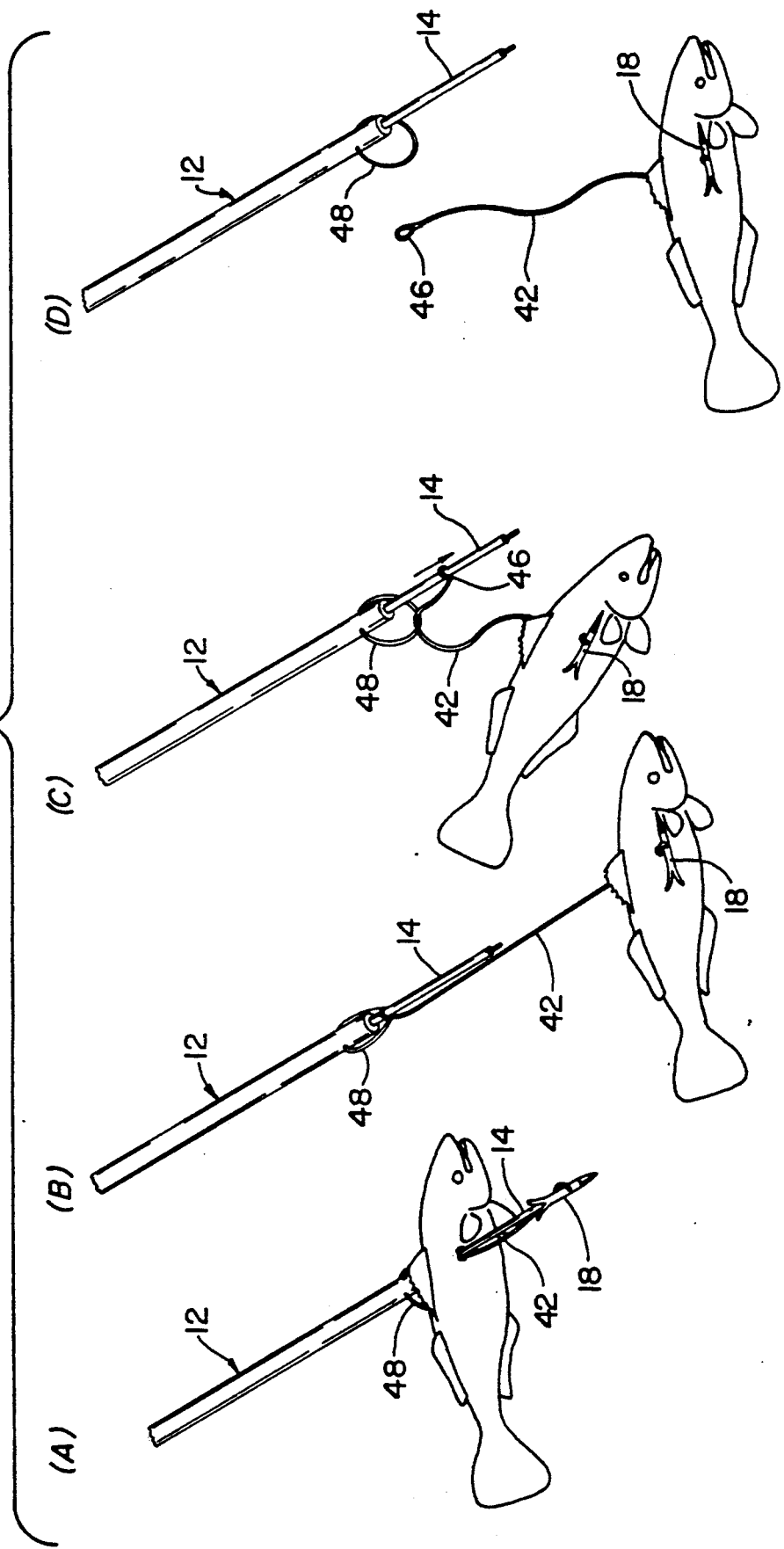

1

FISHING SPEAR

TECHNICAL FIELD

This invention relates to fishing spears and more particularly to the spearpoint, cable, pole and the construction thereof.

BACKGROUND ART

As is well known for underwater gigged fishing equipment and apparatus, it is abundantly important that the spear, utilized in spearing fish underwater, is not only reliable and capable of withstanding severe shocks, vibrations and unexpected exigencies, it must be easy and convenient to operate. Obviously, once underwater, one's mobility is restricted, hence loading and unloading the spear, the inadvertent loss of or misplacement of the spear point, the ease of removal of the fish once speared are conditions that the designer of the spear must be cognizant of and implement in his design.

There are a number of prior art patents that attempt to achieve these features but do not attain the degree of reliability and ease of operation attainable by the present invention. As for example, U.S. Pat. No. 2,918,286 granted to D. S. Foulger on Sep. 12, 1957 entitled "High Pressure Spearhead Attachment" discloses a ball held spear point that is releasable upon movement of a sliding sleeve. It shows a complicated and tedious system for loading and unloading the spearhead.

U.S. Pat. No. 4,896,450 granted to W. H. Rogers on Jan. 30, 1990 and entitled "Spear Gun Tip Assembly" discloses a complex spring loaded clamping means for holding the cable attached to the spear point. In order to release the cable it requires the displacement of a collar to release the end of the cable attached to the spear point. This requires the use of both hands, namely, one to position the clamp and the other to hold the cable.

Other patents of interests are: U.S. Pat. No. 4,624,068 granted to H. V. Harland,III on Hertel on Aug. 14, 1956; and U.S. Pat. No. 2,951,206 granted to L. E. Woodfield on Sep. 6, 1960.

I have found that I can obtain a more efficacious fishing spear that not only is convenient and less cumbersome to use than heretofore known spears, but also affords structural integrity in sports fishing for fish that weigh over fifty (50) pounds. This invention contemplates utilizing a split ring fitted into an annular groove formed in the injector of the spear that serves to spring load the spear point mounted at the end of the ejector. For ease of handling the gigged fish the cable unlike the types disclosed in the prior art is simple to manipulate and can be operated with the use of one hand. In one embodiment it is looped at one end to be secured to the spear point and the other end it is looped over the ejector. A support intermediate the loops prevent the cable from being dislodged. The cable is easily removed after the fish has been speared and withdrawn through the looped end remote from the spear point and the spearpoint may be reinserted on the adapter to be reused or it can serve to hold and haul away the fish. A circular cable supported to the pole may be utilized to tether the cable and prevent it from being dislodged. In another embodiment a spring loaded slidable catch can be substituted for the circular cable.

DISCLOSURE OF INVENTION

An object of this invention is to provide an improved fishing spear for underwater fishing.

A feature of this invention is to provide in the spear as described a split ring mounted in an annular groove formed in the ejector of the spear to spring load the spear point to prevent it from becoming dislodged and being characterized as easy to manipulate, reliable and capable of remaining in tact in spite of severe vibrations and exigencies encountered.

Another feature of this invention is to provide in a spear as described a cable looped at both ends and tethered to the pole to hold the speared fish once the spear point disengages the end of the ejector and facilitate the removal of the cable from the pole and the fish from the spear point.

Another feature of this invention is the utilization of reinforced metal attachments inserted in the aluminum pole to assure the wear, integrity and reliability of the spear.

The foregoing and other features of the present invention will become more apparent from the following description and accompanying drawings.

BRIEF DESCRIPTION OF DRAWINGS

FIG. 2A is an enlarged view of the split ring shown in the bracket 2 of FIG. 1;

FIG. 7 with views A, B, C and D illustrates the cable, spearpoint and ejector of the spear depicted in FIG. 1 with a gigged fish in operation.

BEST MODE FOR CARRYING OUT THE INVENTION

Figure 1:
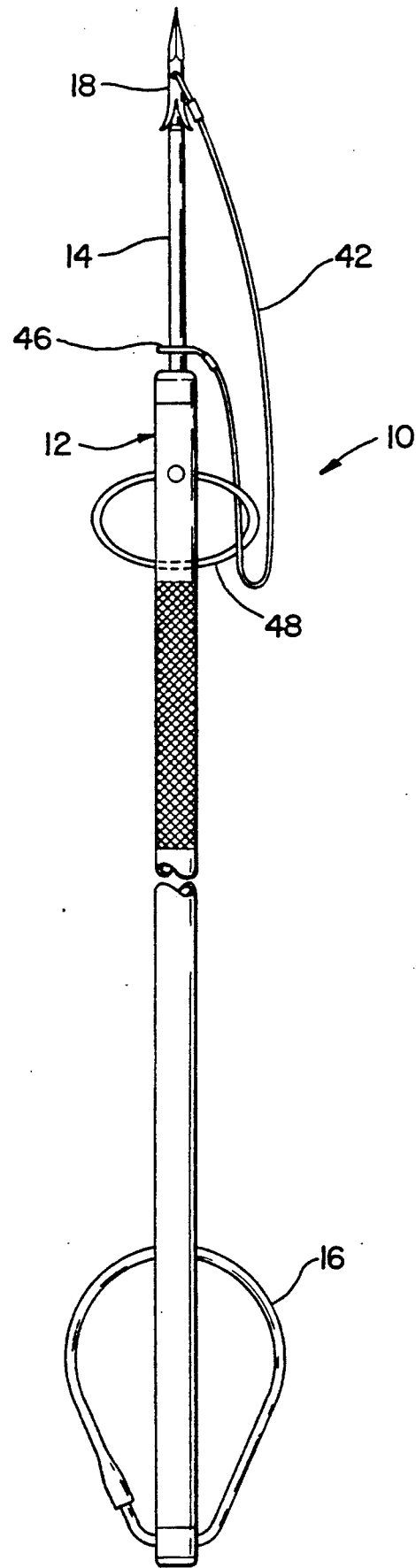
FIG. 1 is a view in elevation showing the complete assembly of the fish spear.

The invention can best be appreciated by referring to FIGS. 1 to 5 which show a preferred embodiment, wherein like numerals designate like parts throughout the several views. As best seen in FIG. 1 the fishing spear generally illustrated by reference numeral 10 consist of a cylindrical pole 12 having an ejector 14 attached to one end of pole 12 and a flexible, resilient circular chord 16, which is typically formed from surgical tubing, attached to the other end used in propelling the spear in a well known manner. The spear point 18 is removably attached to the end of the ejector and a releasable cable 20 holds the spearpoint 18 when dislodged from the end of ejector 14 as will be described in more detail hereinbelow.

Figure 2:
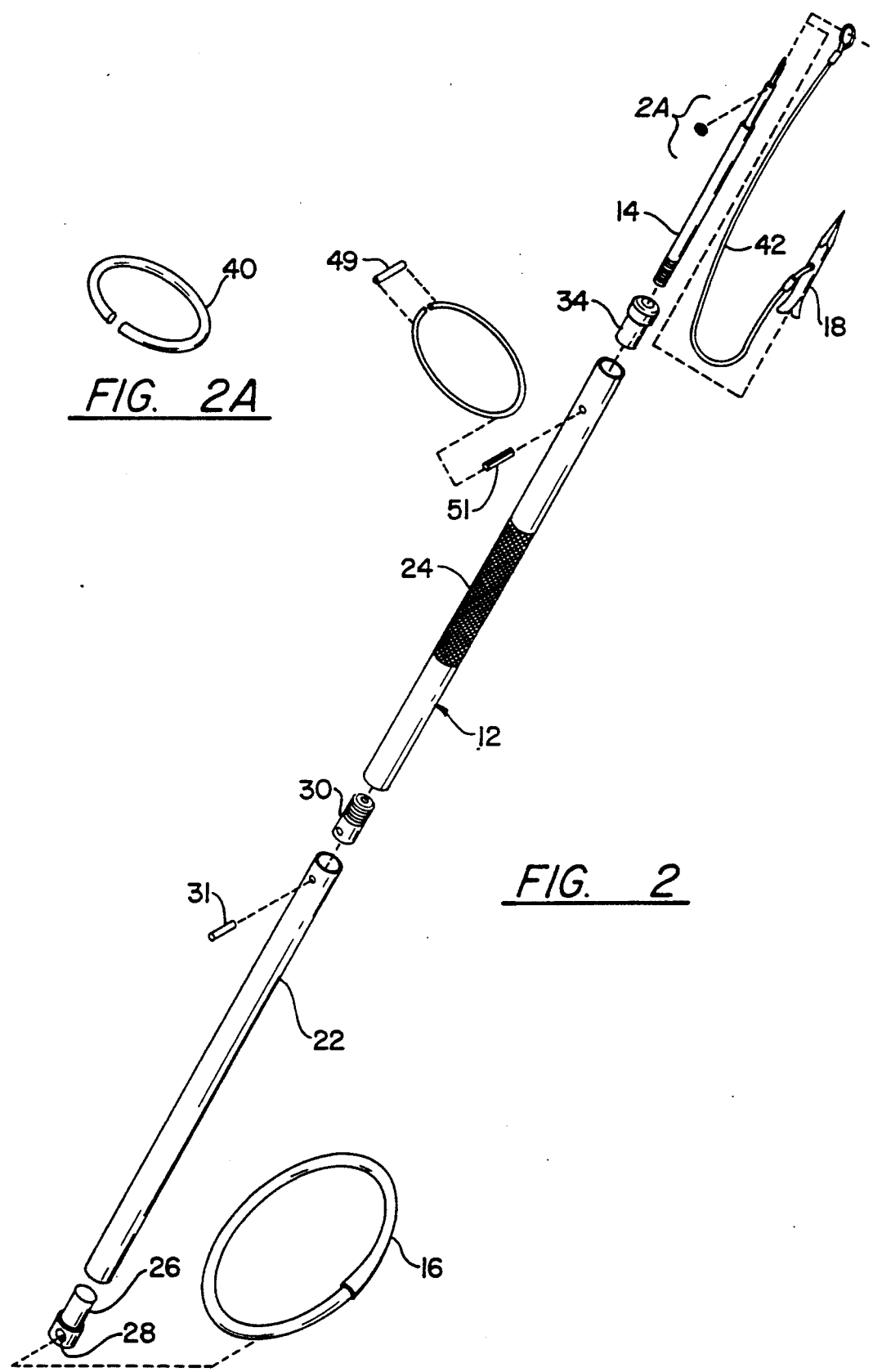
FIG. 2 is an exploded view in perspective illustrating the detail parts of the spear.

The details of pole 10 is better seen in the exploded view in FIG. 2 noting that the pole 12 is formed from three main sections, namely sections 22, 24 and ejector 14. Sections 22 and 24 are the same diameter and are threaded to each other to be detached to reduce the size of the pole for carrying purposes. A portion of the outer surface of section 24 may be knurled in a well known manner for better gripping.

As mentioned above the spear is propelled by looping a circular chord (surgical tubing) attached to the end of the pole around the operator's hand and using its flexibility and resilience by positioning the pole, and releasing it in the direction of the prey. For this purpose, the end plug 26 which is tightly fitted into the end of section 22 carries a hole 28 for receiving the circular chord 16.

Threaded insert 30 is pinned to the end of section 22 by pin 31 engages internal threads formed on the cooperating end of section 24 to splice sections 22 and 24 to form the long pole.

Ejector 14 which comprises the third section is threaded to the threaded insert 34 fitted to the end of section 24. The diameter of the distal end 36 of ejector 14 may be slightly reduced and is sized to accommodate the removable spearpoint 18. According to this invention the reduced diameter end 36 of ejector 18 is formed with an annular groove 38 (best seen in FIGS. 3 and 4) that accommodate split ring 40 whose outside diameter is slightly larger than the diameter of end 36. This serves to secure the spearpoint 18 and apply a spring-like tension and give it better support than any of the heretofore known designs. As is well known the distal barbed end of spear point 18 carries a recess whose diameter compliments the diameter of end 36 of the ejector 14. In certain heretofore known designs the spearpoint would be held in position merely by the frictional forces on the two parts. With the advent of this invention, the spear point is spring loaded by the action of sliding the barbed end of the spearpoint over the ejector end to compress the split ring. This causes the split ring to load the spear point so that this force in addition to the load imposed by the frictional engagement serves to prevent the spearpoint from becoming inadvertently dislodged due to excess vibrations or exigencies encountered. Obviously, the spring loaded teachings of this invention is equally efficacious even in if the spearpoint is loosely fitted to the ejector and no frictional force is employed.

Figures 3, 4:
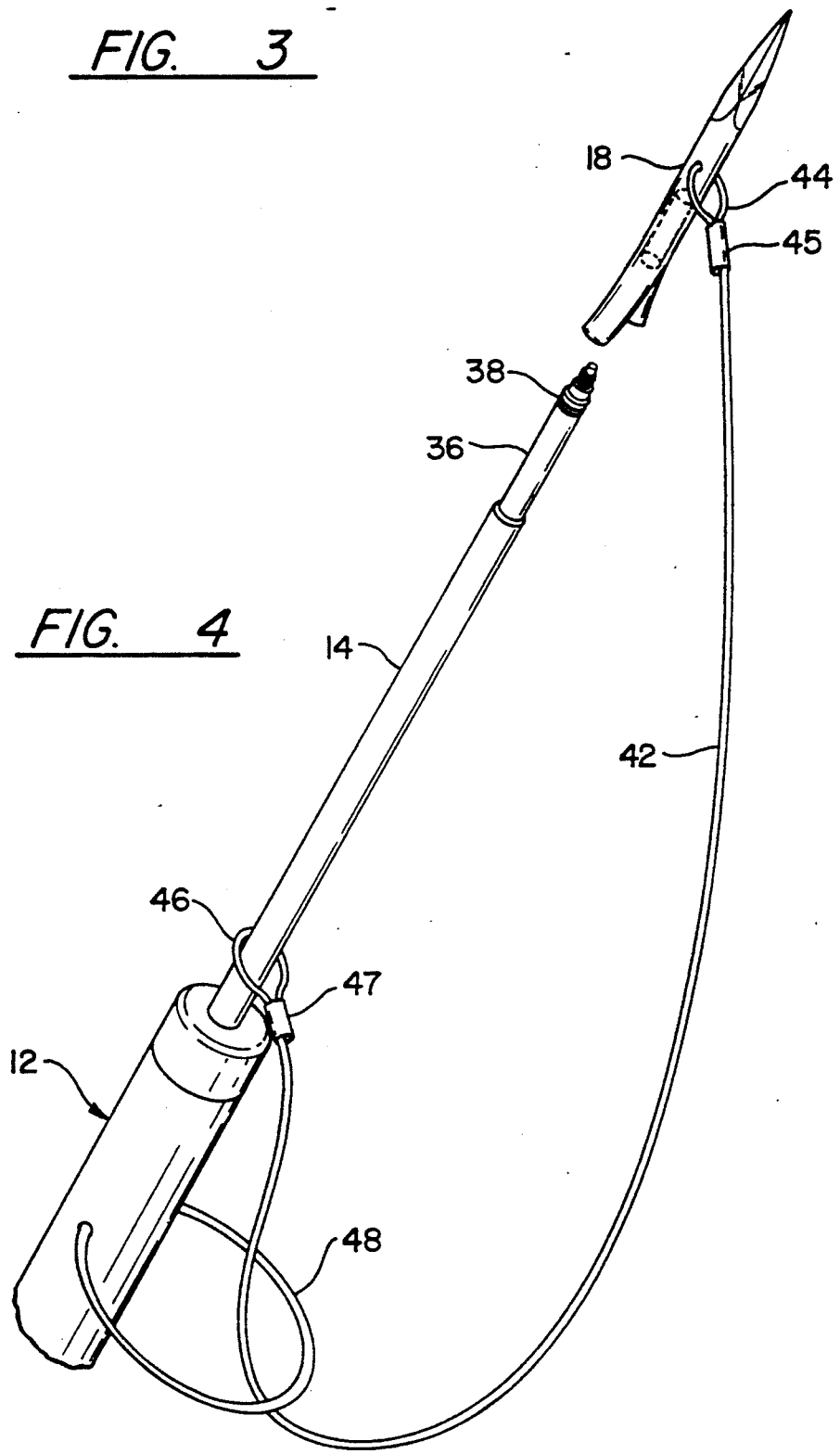
FIG. 3 is a plan view partly in phantom illustrating the ejector.
FIG. 4 is a partial enlarged exploded view illustrating the cable and its attachment.

Also, in accordance with this invention the spearpoint is uniquely prevented from being loss when released from the end of the ejector by use of the flexible cable 42, which is a commercially available braided metal cable. As shown in FIG. 4 the cable 42 is fixed to the spearpoint by passing the end of cable 42 through a transverse passage formed in the center of the spearpoint 18 and then forming a loop at the end of the cable. The loop is formed in a well known manner by, say, a swaged fitting or collar 45. The other end 46 of cable 42 is likewise looped by suitable swaged fitting or collar 47.

Also in accordance with this invention, the tethering of cable 42 includes a circular flexible cable 48 made from the same braided metal cable as is the cable 42 whose ends are secured by a suitable swaged fitting 49 to form a loop. Tethering the cable 42 to the pole 12 is accomplished simply by inserting the distal end of the ejector through loop 44 and allowing it to slide to the opposite end of ejector 14 and rest against the end of pole 12, noting that the diameter of loop 44 is less than the diameter of the pole 12, so that the cable is restrained from backing up the pole. The forward end of the cable 42 and the spearpoint 18 are passed through the loop 48 as shown. The length of the cable should be selected so that there is ease in assembly and disassembly, while not having too much slack. The mounting of the cable is a threading operation and can be accomplished with the use of one hand.

A metal tubular insert 51 may be fitted to pole 12 to guide loop 48 and provide a wear resistance surface.

The ejector may be threaded at one end to accommodate different spearpoints that are commercially available. The threads, which preferably are 6 mm can also be used to attach other equipment, such as gigs, power heads, tagging mechanism and the like. It is desirable to provide a tapered tip 50 at the end of the threads 52 to minimize the likelihood of damage to the threads.

FIG. 7 illustrates the operation of the ejector, spearpoint and cable for gigging a fish and removing the fish from the pole. As noted in view A the spear is propelled and the ejector penetrates through the body of the prey to the distal end of the pole. Once the fish is speared the ejector is withdrawn as noted in view B and by virtue of the barbs the spear point is dislodged from the end of the ejector by overcoming the force of the split ring and rotates 90° in the removal process so that the spear point can not be withdrawn. The loop 46 is then retracted from the ejector 14 and the circular cable 48 as depicted by the arrow in view C. Once the cable 42 is removed from the pole 12, the cable can then be removed from the fish merely by grasping the spearpoint and sliding the cable in the direction depicted by the arrow in view D and withdrawing the cable by passing the loop 46, which is sufficiently flexible, through the wound created by the spearpoint 18.

Figure 6:
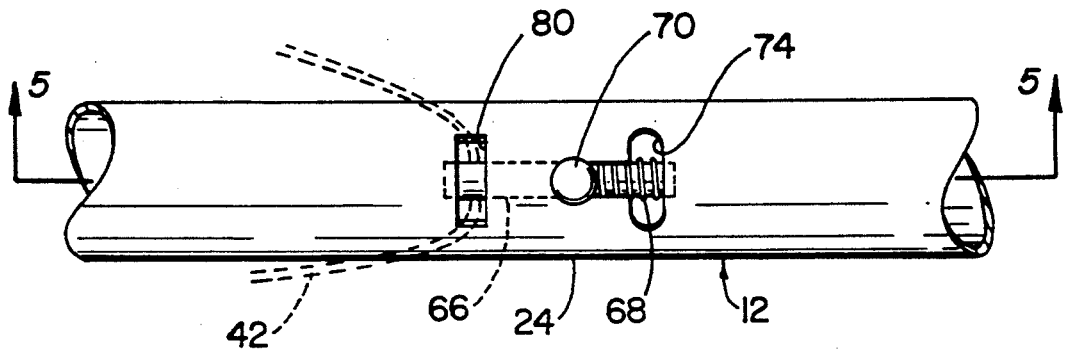
FIG. 6 is a top plan view of the catch of FIG. 5.
Figure 5:
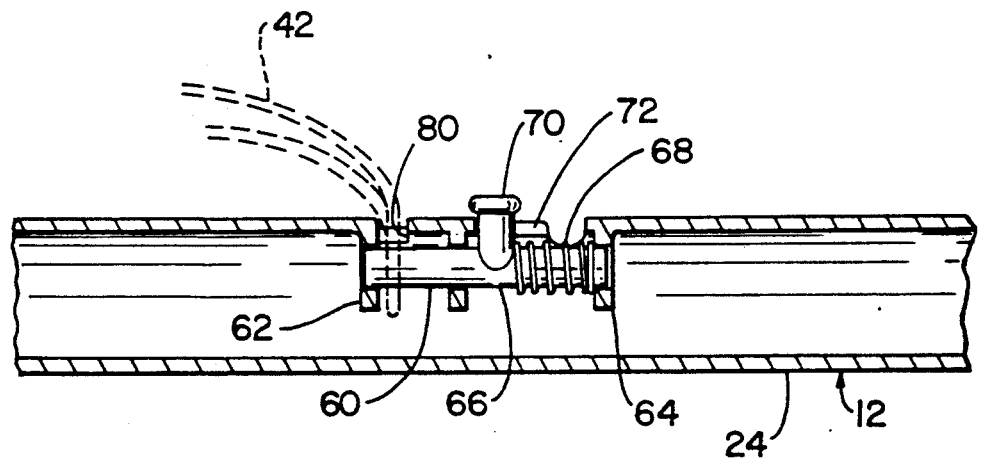
FIG. 5 is a partial view partly in section and partly in elevation showing another embodiment utilizing a slidable catch to secure the cable.

FIGS. 5 and 6 exemplify another embodiment for tethering the cable 42. A slidable latch 60 supported in depending flanges 62 and 64 includes a rod element 66 slidably mounted in openings formed in flanges 62 and 64. Spring 68 bottomed out against flange 64 urges rod element 66 leftwardly as shown in this FIG. to the closed position. Handle 70 transversely supported to rod element 66 extends through an elongated slot 72 formed in pole 12. To operate, the latch is slid rearwardly and handle 70 is slightly rotated at the end of its travel to fit into detente 74. This holds the latch opened. The cable 42 is bent into a U-shaped loop and dropped in the opening 80 formed in pole 12. The handle is then rotated to align with slot 72 and the spring 68 urges the rod element 66 to the closed position. To remove the cable from the pole, once the loop 46 is dislodged from the ejector 14, the cable will slide under the rod element 66 of the latch so that the latch needn't be utilized.

I have found that a spear constructed with components fabricated with the following materials tested to be reliable and structurally sound. Inserts and pins 51, 34, 26 and 30 may be made from a suitable metal alloy, such as stainless steel or 6061 T651 AL rod. Split ring 40 may be fabricated from SS wire and dimensioned to have a substantially 0.029 inch diameter. The sections 22 and 24 may be fabricated from 0.5 inch diameter SCH. 40 6061-T6 aluminum structural pipe. The braided cable may be 1/16 diameter stainless steel braid of approximately 600 pound test.

Although this invention has been shown and described with respect to detailed embodiments thereof, it will be appreciated and understood by those skilled in the art that various changes in form and detail thereof may be made without departing from the spirit and scope of the claimed invention.

I claim:

1. A gigged fishing spear including a elongated tubular pole having a reduced diameter ejector attached to the distal end thereof, a removable spearpoint having a pointed end and a barbed end means at the distal end of said ejector being sized to fit into a recess formed on the barbed end of said spearpoint, a ring mounted in an annular groove in said ejector extending slightly above said annular groove and disposed relative to said spearpoint to engage the walls defining said recess of said spearpoint so as to be compressed and to spring load said spearpoint when in a mounted position.

2. A gigged fishing spear as claimed in claim 1 wherein said ring is a split ring.

3. A gigged fishing spear as claimed in claim 2 wherein said split ring is a flexible, resilient metallic material.

4. A gigged fishing spear as claimed in claim 1 including a threaded portion formed on the distal end of said ejector and a tapered extension on said ejector extending axially upstream of said distal end of said ejector relative to said pole.

5. A gigged fishing spear as claimed in claim 1 wherein said pole is formed in at least two sections and each section having cooperating threads for assembling said sections in a unitary pole.

6. A gigged fishing spear as claimed in claim 5 including an insert extending axially at the proximal end of said pole and having an aperture for accommodating a circular shaped surgical tube used for propelling said spear.

7. A gigged fishing spear as claimed in claim 1 including a tethering cable having a pair of loops, each loop of said pair of loops disposed at either end thereof, one loop securing said spearpoint to said cable and the other loop of said pair of loops fitting said ejector and being sized so that the diameter of said other loop is smaller than the diameter of said pole, and means attached to said pole adjacent the distal end of said pole for securing said tethering cable at a location intermediate said pair of loops to said pole.

8. A gigged fishing spear as claimed in claim 7 wherein said cable is a stainless steel braided cable.

9. A gigged fishing spear as claimed in claim 7 wherein means for securing said tethering cable includes a slidable latch mounted in said pole parallel to the longitudinal axis of said pole, spring means for urging said latch in a closed position and a handle attached to said latch for moving said latch in a direction opposing the force of said spring.

10. A fishing spear having a pole and an ejector extending axially from the distal end of said pole, means including a circular tube mounted on the proximal end of said pole for propelling said spear and a spear point having a recess to accommodate the distal end of said ejector, the improvement comprising a split ring mounted in an annular groove formed in said ejector adapted to be inserted into said recess and spring load said spearpoint to said ejector, in combination with a tethering cable having one end attached to substantially the midpoint of said spearpoint, a loop formed on the remote end of said tethering cable for fitting over the end of said ejector, means including a circular cable attached adjacent the distal end of said pole and being in slidable relationship with said tethering cable for supporting said tethering cable at a point intermediate said loop and said spearpoint.

11. A fishing spear as claimed in claim 10 wherein said split ring is a flexible, resilient metallic material and said tethering cable is a braided stainless steel wire.

* * * * *